Figure 1:
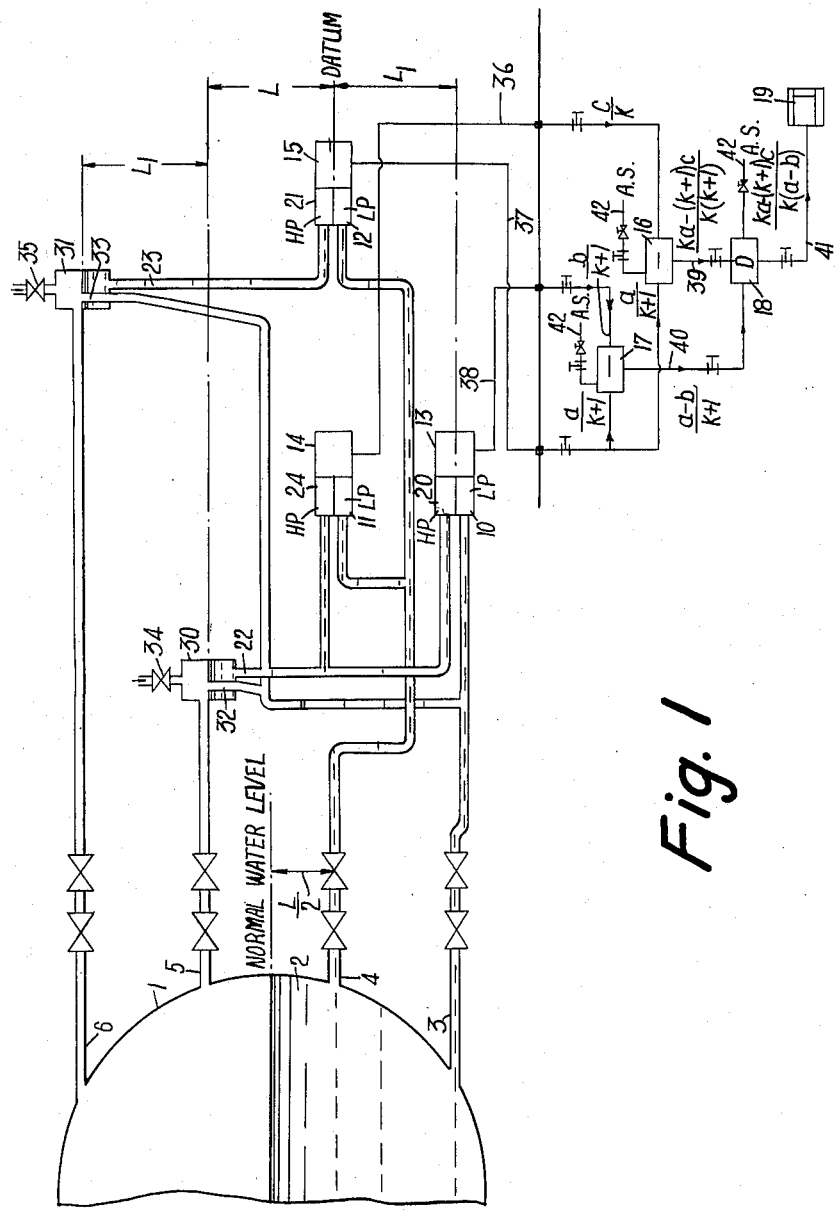

May 10, 1966 — I. A. CLAYTON — 3,250,123

LIQUID LEVEL MEASURING APPARATUS

Filed Feb. 20, 1964 — 2 Sheets-Sheet 1

INVENTOR
IAN ANTHONY CLAYTON

BY
ATTORNEY.

May 10, 1966  I. A. CLAYTON  3,250,123
LIQUID LEVEL MEASURING APPARATUS
Filed Feb. 20, 1964  2 Sheets-Sheet 2

INVENTOR.
IAN ANTHONY CLAYTON
BY
ATTORNEY.

United States Patent Office 3,250,123
Patented May 10, 1966

3,250,123
LIQUID LEVEL MEASURING APPARATUS
Ian Anthony Clayton, Southall, Middlesex, Engand, assignor to Honeywell Inc., a corporation of Delaware
Filed Feb. 20, 1964, Ser. No. 346,189
15 Claims. (Cl. 73—301)

This invention relates to the measurement of liquid levels in vapour generators, or in other plants where liquid level in a pressurised vessel is to be determined. The invention will be described particularly in relation to the determination of water level in boiler drums, although it will be apparent that it has other applications.

It is an object of the invention to achieve an improved apparatus for determining such liquid levels, which apparatus computes the required quantity in a comparatively simple way yet taking into account both liquid and vapour densities.

According to one aspect of the present invention there is provided liquid level measuring apparatus comprising three differential pressure devices each connected between one of two liquid pressure sampling points at different levels of the boiler drum, or other vessel in which the level is to be measured, and one of two vapour pressure sampling points that are spaced apart in level by the same distance as that between the two liquid pressure sampling levels in an arrangement such as to obtain three signals representing different pressure differentials as between the pressures at the liquid pressure sampling points and at the vapour pressure sampling points, together with computing means for mathematically processing the three pressure differentials so obtained to produce an output representative of the liquid level.

According to another aspect, the invention provides liquid level measuring apparatus comprising three differential pressure devices, each connected between one of two liquid pressure sampling points at different levels within the drum, or other vessel in which the level is to be measured, and one of two vapour pressure sampling points that are spaced apart in level, by the same distance as that between the liquid pressure sampling levels, a first one of the differential pressure devices being connnected between the upper of the two vapour pressure sampling points and the upper of the two liquid pressure sampling points, and a second being connected between the lower vapour pressure sampling point and the lower liquid pressure sampling point, whereby there are obtained three signals representing different pressure differentials as between the pressures at the liquid pressure sampling points and at the vapour pressure sampling points, and wherein two subtracting relays and one dividing relay are arranged to mathematically process the three differential pressure signals to eliminate the liquid and vapour density variables and yield an output representative of the liquid level.

The pressures from the various levels of the drum can be applied to the inputs of differential pressure transducers by means of pairs of pipes, with care taken to minimise any variable pressure drop along these pipes. Preferably, the pipes are run horizontally so there is no gravity effect. If there are any non-horizontal portions of the piping these should be at substantially the same temperature, which may be the atmospheric ambient temperature in the boiler house. A permanent change of level, i.e. one in which the piping does not return to the original drum sampling level further along the pipe run, can be attained if required, by transmitting the pressure from one level to another by way of a constant head column of water. Differential pressure transducers are available that can be adjusted to supress the effects of such constant heads.

Any constant head water columns utilised may be maintained at a temperature of the order of the ambient air temperature in the boiler house, thus avoiding difficulties which might arise with a system employing constant head columns at or near the boiler drum temperature; for example incorrect pressure differentials due to "flashing off" during boiler load changes.

The invention comprehends the use of such apparatus with control equipment for regulating the water feed into the boiler. A suitable form of control equipment is a three input-signal control having means for sensing the boiler steam output, and further means for sensing the fed water flow, in addition to apparatus according to the invention for determining the liquid level in the drum.

Figure 2:
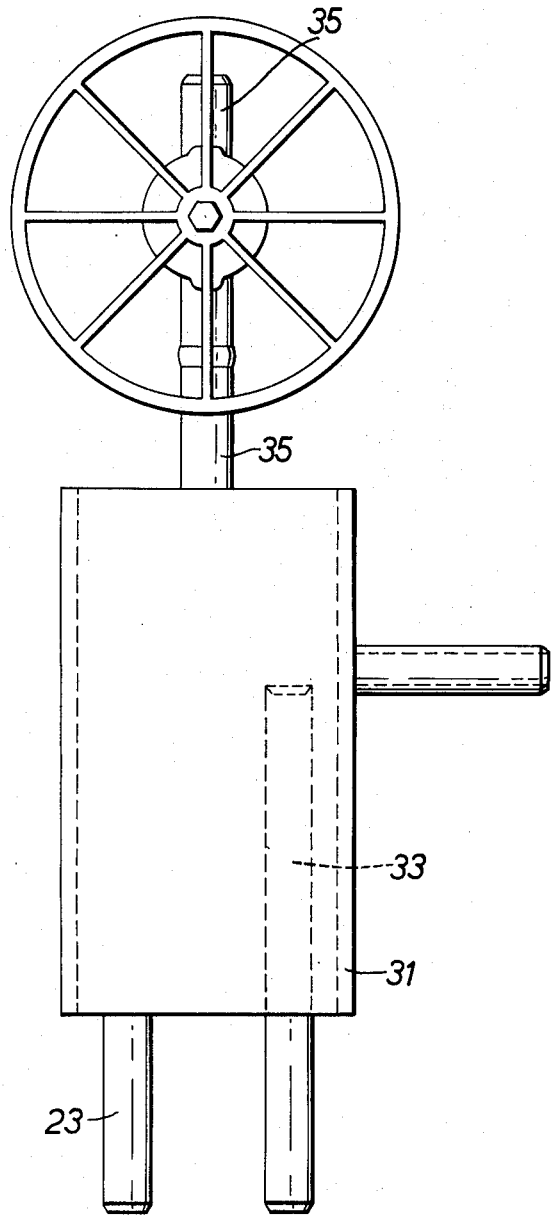

An example of the practical application of the invention will now be described with reference to the accompanying diagrammatic drawings in which FIGURE 1 shows a block schematic diagram of the apparatus and FIGURE 2 shows a cross section of a constant head device employed in it.

In the drawing there is shown a boiler drum 1 containing a body of water 2 and a body of steam under pressure above it. The pressure in the boiler is sampled at various heights by means of pipe connections 3, 4, 5 and 6, the first two of which 3, 4 are usually below the water level in the drum in operation while the other two 5, 6 are usually above it. Pipe connection 4 defines the lowest measurable water level and pipe connection 5 the highest measurable water level.

Pipe connections 3 and 4 have substantially horizontal pipe runs leading respectively to the low pressure inputs 10 and 11 of two bellows type differential pressure transducers 13 and 14; and pipe 4 is additionally connected to the low pressure input 12 of a third differential pressure transducer 15. The high pressure inputs 20, 21 of the transducers 13, 15 are connected respectively through constant head columns of water 22, 23 to horizontal pipe runs embodying the pipe connections 5, 6 and the high pressure input 24, of the transducer 14 is also connected to the water column 22. The water columns 22, 23 have head tanks 30, 31 with upstanding drain pipes 32, 33 therein for establishing the water levels, and inlet valves 34, 35 are provided for initially filling the columns. It will be observed that the water columns and their drain pipes will serve to drain off condensate from the steam pipes 5 and 6. Head tank 31 and the associated pipes 23, 33 and 35 are shown in greater detail in FIGURE 2 of the drawings.

The water columns 22, 23 are disposed a sufficient distance from the boiler drum not to be influenced by temperature changes therein and are substantially at the ambient temperature of the boiler room.

Pipe connections 5 and 6 and pipe connections 3 and 4 are spaced apart in level by equal distances $L_1$, and pipe connections 4 and 5 are spaced apart in level by a distance L which is equal to the distance $L_1$ multiplied by a factor $k$. This factor $k$ will be referred to later in the description.

The differential pressure transducers can be chosen to have a pneumatic output or an electrical output. A suitable form of pneumatic output differential pressure transducer is the Model 224N bellows type differential pressure transducer and pneumatic transmitter marketed by the assignee company, details of which are described in the co-pending U.S. application, Serial No. 72,147, now Patent No. 3,126,744 filed on November 28, 1960 and assigned to the same assignee as the present application. Such an instrument can be set by adjustment of a bias spring to suppress a constant pressure applied to one side of its bellows, such as the static pressure due to the constant head of water in the column 22 or 23. If an electrical output signal is wanted, the assignee company's Electrik Tel-O-Set $\Delta P/I$. Transmitter will give this.

The differential pressure transducers do not have identical sensitivities but introduce scaling factors into the output signals. Conveniently each transducer 13, 14, 15 has a sensitivity such that it gives its full output for a pressure input corresponding to the height of the constant head column associated with it.

Thus it will be seen that transducers 13, 14 and 15 will have scaling factors in the ratio of $$\frac{1}{1+k} : \frac{1}{k} : \frac{1}{1+k}$$

respectively.

The differential pressure output signals of transducers 14 and 15 are fed through lines 36 and 37 to a subtracting relay 16. An example of a typical commercially available pneumatic relay that can be employed for this duty, if the differential pressure transducers deliver a pneumatic output, is Model 68 Series Multi Function Relay manufactured by Sunvic Controls Limited of Harlow, Essex, England. The outputs of transducers 15 and 13 are likewise applied through lines 37 and 38 to another such subtracting relay 17.

The signals delivered on lines 39 and 40 by the two subtracting relays 16, 17 form the inputs to a dividing relay 18. Suitable pneumatic relays are available commerically and reference may be made to U.S. specification 3,079,074 for a description of a typical example. Relay 18 delivers its output signal on line 41 to a chart recorder 19 and also, if desired, to automatic control equipment, such as the aforementioned three input boiler feed water control. The recorder 19 may be a standard pneumatic-input chart recorder such as manufactured by the assignee company.

In the drawing each of the computer components 16, 17 and 18 is assumed to be pneumatic and is shown receiving an air supply from a line 42.

Analysing the above system mathematically it can be shown that:

the output of transducer 13 represents $$(L_1+h)\rho_o+(L-h)\rho_s \quad (1)$$

the output of transducer 14 represents $$h\rho_o+(L-h)\rho_s \quad (2)$$

the output of transducer 15 represents $$h\rho_o+(L+L_1-h)\rho_s \quad (3)$$

where $h$ is the height of the unknown liquid level above the upper of the two liquid pressure sampling points; $\rho_o$ is the density of the liquid in the drum; and $\rho_s$ is the density of the vapour in the drum.

For the two steam pressure sampling points the important levels are the top surfaces of the water columns 22, 23. The spacing $L$ will ordinarily be chosen to be equal to the full range of level measurement desired, with the upper of the two liquid pressure sampling points representing a datum level such that the required normal water level is at a distance $L/2$ above it; that is to say the liquid pressure sampling points are, respectively, at distances $L/2$ and $L/2+L_1$ below the normal water level, while the steam pressure sampling points are at distances $L/2$ and $L/2+L_1$ above the normal level.

In the above expressions (1), (2) and (3), terms representing the constant static heads of water in the columns 22 and 23 do not appear, being suppressed in the differential pressure transducers.

The output signal of relay 16 is the difference of expression (2) scaled by a factor $1/k$ and expression (3) scaled by a factor $1/(k+1)$ which is $$h(\rho_o-\rho_s) \quad (4)$$

The output signal of relay 17 is the difference of expressions (1) and (3) both scaled by a factor $1/(k+1)$ which is:

$$L(\rho_o-\rho_s) \quad (5)$$

and therefore the signal delivered from relay 18, which effectively divides expression (4) by expression (5), represents $h/L$. Since $L$ is a known constant, this gives the required variable $h$.

The above mathematical analysis has not involved terms due to changes in ambient temperature, i.e. temperature of the water in the constant head columns, and due to possible tilting of these columns, for example, in the case of boiler plant aboard ship. It can be shown however, that, whether or not constant head suppression is employed, such variations cancel and do not affect the final quantity $h$.

The maximum variation in water level may be greater than the level variation actually measurable by the apparatus, i.e. greater than $L$, with the output indication reading continuously zero or continuously a maximum so long as the water level is respectively below the sampling point 4 or above the sampling point 5.

If measurment is to be achieved over a wide range it is necessary to have a large vertical spacing between the sampling points 4 and 5. Thus, in some circumstances, it may be impracticable or impossible to space the pressure sampling points apart by equal amounts. However, it may be convenient in many cases to have $L=L_1$.

The invention can be reduced to practice in other ways. The subtracting relays can be arranged differently. For example subtracting relay 16 may be connected to the outputs of differential pressure transducers 13 and 14. If this is done the output from dividing relay 18 is $$1-\frac{h}{L}$$

but this can easily be changed to a signal proportional to $h$ by means of an additional component that sums a constant (negative unity) with the dividing relay output quantity. Moreover the three differential pressure transducers need not be connected as shown. One of these transducers may be connected between the upper vapour level and the lower liquid level. A transducer so connected would have a scaling factor $$\frac{1}{k+2}$$

associated with it but otherwise the calculations are the same.

If as many as four pipe connections entering into the actual boiler drum is not permissible, both the steam horizontal pipe runs and/or both the water horizontal pipe runs can be joined together so as to permit a common steam pipe connection to the boiler drum and/or a common water connection. The changes of levels involved can then be obtained by pipes running over the surface of the drum and lagged so as to maintain these pipes substantially at the temperature in the drum. It will be appreciated that such pipes form in effect extensions of the drum and do not materially alter the above analysis.

While in the drawing the differential pressure transducers 13, 14 and 15 are shown disposed at the levels of the boiler drum water level connections 3 and 4, this has been done for ease of analysis and in practice the transducers need not be at these levels so long as the condition previously mentioned herein for permanent change of level is observed.

The apparatus may be required to provide a signal for use in controlling the flow of feed water to the boiler. In a typical case, where the flow is also controlled in accordance with the rate of output steam flow, there may typically be provided a closed flow rate control loop in the feed water line to the boiler. This might conventionally comprise an adjustable valve for controlling the rate of flow, a pneumatically controlled actuator for adjusting the valve position, a conventional venturi construction in the feedwater line upstream of the valve and a transducer associated with it for generating a pneumatic signal proportional to the differential pressure in the venturi and thus to the square of the rate of flow, and a square-root extractor for producing a pneumatic signal proportional to the rate of flow. This last signal is fed to a conventional pneumatic chart recorder and controller including a set-point index such that in addition to recording the rate of flow a pneumatic control signal is provided for feeding to the actuator so as to adjust the valve position in the sense required to reduce any deviation of the flow rate from a set value.

The position of the set point index is itself controlled pneumatically by a signal dependent on the rate of flow of steam from the boiler and the water level within it. For this purpose, the steam line has a venturi in it associated with which is a differential pressure transducer and square root extractor similar to those associated with the feedwater line. This again is fed to a recorder producing a control signal representing any departure of the steam flow rate from a set value. At the same time, the recorder 19 has a set point index and an associated controller producing a pneumatic signal representing any departure of the water level from a set value. The water level and steam flow rate signals are subtracted in a suitable pneumatic relay and the output of the relay is fed to control the setting of the set point index in the water flow rate recorder in the sense required to adjust the flow to make up for an increase or decrease in evaporation rate. For example an increase in evaporation will lead to an increased steam flow rate and eventually a fall in water level which are combined to adjust the set point for the water fluid rate upwards in order to increase, as required, the rate of flow of water.

I claim:

1. A liquid level measuring apparatus for measuring the level of a liquid in a pressurized vessel that contains a liquid under pressure and a vapor above the liquid that is under pressure comprising three differential pressure devices, a first one of the devices being connected to the upper one of two liquid pressure sampling points positioned at different levels below the level of the liquid in the vessel and to the lower one of two vapor pressure sampling points positioned at different levels above the level of the liquid in the vessel, a second one of the devices being connected to the lower one of the two liquid pressure sampling points and to the lower one of the two vapor pressure sampling points, a third one of the devices being connected to the upper one of the two liquid pressure sampling points and to the upper one of the two vapor pressure sampling points, the two liquid level sampling points being spaced apart at substantially the same distance that the vapor level sampling points are spaced apart, said devices being operable to produce three separate signals that represent three different pressure differentials that exist between the different liquid-vapor sampling points, and a computing means operably connected to the three differential pressure devices to receive the three signals, to cancel out the effect that a change in the density of the liquid and vapor has on the three separate signals and to produce an output signal in response to the three signals whose magnitude varies in a linear proportional manner with changes that occur in the liquid level of the liquid in the vessel.

2. The apparatus as defined in claim 1 wherein, horizontally positioned pipes are employed which are connected at one end to the liquid and vapor sampling points and which have another end connected to their associated differential pressure device sufficiently far away from the vessel at a remote distance where the temperature effecting the liquid or vapor therein is substantially at the ambient temperature which surrounds the pipes at these remote locations.

3. The apparatus defined by claim 1 wherein, at least one of the pressures at the vapor pressure sampling points are applied to the differential pressure devices by way of constant head columns of water.

4. The apparatus defined by claim 1 wherein, at least one of the pressures at the vapor pressure sampling points are applied to the differential pressure devices by way of constant head columns of water and wherein the differential pressure devices are adjusted to suppress the effect of the constant heads.

5. The apparatus defined by claim 1 in combination with control equipment for regulating the water feed into the boiler which control equipment receives as its input the linear computed water level signal and also signals representative of boiler steam output and feed water flow rate.

6. Liquid level measuring apparatus for a pressurized vessel such as a boiler drum, comprising three differential pressure devices, each connected between one of two liquid pressure sampling points at different levels within the drum in which the level is to be measured and one of two vapor pressure sampling points that are spaced apart in level by the same distance as that between the liquid pressure sampling levels, a first one of the differential pressure devices being connected between the upper of the two vapor pressure sampling points and the upper of the two liquid pressure sampling points, a second one of the devices being connected between the lower vapor pressure sampling point and the lower liquid pressure sampling point, a third one of said devices being connected between the upper vapor pressure sampling point and the lower of the liquid pressure sampling points, whereby there are obtained three signals representing different pressure differentials as between the pressures at the liquid pressure sampling points and at the vapor pressure sampling points, and wherein two subtracting relays and one dividing relay are operably connected with the three differential pressure devices to receive the signal produced thereby and to mathematically process the three differential pressure signals to eliminate the effect of the liquid and vapor density variables introduced therein and to produce an output signal that is representative of the liquid level.

7. Apparatus according to claim 6 wherein, horizontally positioned pipes are employed which are connected at one end to the liquid and vapor sampling points and which have another end connected to their associated differential pressure device sufficiently far away from the vessel at a remote distance where the temperature effecting the liquid or vapor therein is substantially at the ambient temperature which surrounds the pipes at these remote locations, and wherein at least one of the pipe legs has a non-horizontal portion immediately adjacent the drum which will be maintained substantially at the drum internal temperature and constitute in effect an extension of the drum.

8. The apparatus as defined in claim 6 wherein, columns of water providing a constant head are employed to apply the pressures of each of the vapor pressure sampling points to their associated differential pressure devices.

9. The apparatus as defined in claim 6 wherein, columns of water providing a constant head are employed to apply the pressures of each of the vapor pressure sampling points to their associated differential pressure devices and wherein the differential pressure devices are adjusted to suppress the effects of the constant head.

10. The apparatus as defined by claim 6 wherein, the distance between the upper liquid pressure sampling level and the lower vapor pressure sampling level is equal to the product of a factor $k$ and the distance between the two liquid pressure sampling levels, and the three differential pressure devices are arranged to have scaling factors of $1/(1+\text{the factor } k)$ in the case of the first and second device and 1/(the factor $k+2$) for the third differential pressure device.

11. Liquid level measuring apparatus for a pressurized vessel such as a boiler drum, comprising three differential pressure devices, each connected between one of two liquid pressure sampling points at different levels within the drum in which the level is to be measured and one of the two vapor pressure sampling points that are spaced apart in level by the same distance as that between the liquid pressure sampling levels, a first one of the differential pressure devices being connected between the upper of the two vapor pressure sampling points and the upper of the two liquid pressure sampling points, a second one of the devices being connected between the lower vapor pressure sampling point and the lower liquid pressure sampling point, a third one of the differential pressure devices being connected between the lower of the two vapor pressure sampling points and the upper of the two liquid pressure sampling points, whereby there are obtained three signals representing different pressure differentials as between the pressures at the liquid pressure sampling points and at the vapor pressure sampling points, and wherein two subtracting relays and one dividing relay are operably connected with the three differential pressure devices to receive the signal produced thereby and to mathematically process the three differential pressure signals to eliminate the effect of the liquid and vapor density variables introduced therein and to produce an output signal that is representative of the liquid level.

12. The apparatus as defined by claim 11 wherein, the distance between the upper liquid pressure sampling level and the lower vapor pressure sampling level is equal to the product of a factor $k$ and the distance between the two liquid pressure sampling levels, and the three differential pressure devices are arranged to have scaling factors of $1/(1+\text{the factor } k)$ in the case of the first and second device and $1/k$ for the third differential pressure device.

13. Liquid level measuring apparatus for a pressurized vessel such as a boiler drum, comprising three differential pressure devices, each connected between one of two liquid pressure sampling points at different levels within the drum in which the level is to be measured and one of the two vapor pressure sampling points that are spaced apart in level by the same distance as that between the liquid pressure sampling levels, a first one of the differential pressure devices being connected between the upper of the two vapor pressure sampling points and the upper of the two liquid pressure sampling points, a second one of the devices being connected between the lower vapor pressure sampling point and the lower liquid pressure sampling point, a third one of the differential pressure devices being connected between the lower of the two vapor pressure sampling points and the upper of the two liquid pressure sampling points, whereby there are obtained three signals representing different pressure differentials as between the pressures at the liquid pressure sampling points and at the vapor pressure sampling points, two subtracting relays and one dividing relay operably connected with the three differential pressure devices to receive the signal produced thereby and to mathematically process the three differential pressure signals to eliminate the effect of the liquid and vapor density variables introduced therein and to produce an output signal that is representative of the liquid level, and wherein a first one of the two subtracting relays receives as inputs the differential pressure outputs of the first and third differential pressure devices, the second subtracting relay receives as inputs the differential pressure outputs of the first and second differential pressure devices, and the dividing relay receives as inputs the outputs of the two subtracting relays and delivers an output representative of liquid level.

14. Liquid level measuring apparatus for a pressurized vessel such as a boiler drum, comprising three differential pressure devices, each connected between one of two liquid pressure sampling points at different levels within the drum in which the level is to be measured and one of the two vapor pressure sampling points that are spaced apart in level by the same distance as that between the liquid pressure sampling levels, a first one of the differential pressure devices being connected between the upper of the two vapor pressure sampling points and the upper of the two liquid pressure sampling points, a second one of the devices being connected between the lower vapor pressure sampling point and the lower liquid pressure sampling point, a third one of the differential pressure devices being connected between the lower of the two vapor pressure sampling points and the upper of the two liquid pressure sampling points, whereby there are obtained three signals representing different pressure differentials as between the pressures at the liquid pressure sampling points and at the vapor pressure sampling points, two subtracting relays and one dividing relay operably connected with the three differential pressure devices to receive the signal produced thereby and to mathematically process the three differential pressure signals to eliminate the effect of the liquid and vapor density variables introduced therein and to produce an output signal that is representative of the liquid level, and wherein a first one of the two subtracting relays receives as inputs the differential pressure outputs of the second and third differential pressure devices, the second subtracting relay receives as inputs the differential pressure outputs of the first and second differential pressure devices, and the dividing relay receives as inputs the outputs of the two subtracting relays and delivers an output representative of a linear function of liquid level.

15. Liquid level measuring apparatus for a pressurized vessel such as a boiler drum, comprising three differential pressure devices, each connected between one of two liquid pressure sampling points at different levels within the drum in which the level is to be measured and one of the two vapor pressure sampling points that are spaced apart in level by the same distance as that between the liquid pressure sampling levels, a first one of the differential pressure devices being connected between the upper of the two vapor pressure sampling points and the upper of the two liquid pressure sampling points, a second one of the devices being connected between the lower vapor pressure sampling point and the lower liquid pressure sampling point, a third one of the differential pressure devices being connected between the lower of the two vapor pressure sampling points and the upper of the two liquid pressure sampling points, whereby there are obtained three signals representing different pressure differentials as between the pressures at the liquid pressure sampling points and at the vapor pressure sampling points, two subtracting relays and one dividing relay operably connected with the three differential pressure devices to receive the signal produced thereby and to mathematically process the three differential pressure signals to eliminate the effect of the liquid and vapor density variables introduced therein and to produce an output signal that is representative of the liquid level, and wherein the differential pressure devices are adjusted to suppress the effects of the constant heads.

References Cited by the Examiner

UNITED STATES PATENTS

| | | | |
|---|---|---|---|
| 2,250,341 | 7/1941 | Wunsch | 73—299 X |
| 2,251,477 | 9/1950 | Pellettere | 73—299 |
| 2,612,044 | 9/1952 | De Mart | 73—299 |
| 2,851,016 | 9/1958 | Kinderman | 73—302 X |
| 3,038,336 | 6/1962 | Peters | 73—438 X |
| 3,126,744 | 3/1964 | Hermanns | 73—407 |

ISAAC LISANN, *Primary Examiner.*

F. H. THOMSON, *Examiner.*